Nov. 13, 1945.                F. KOLARIK                2,388,747
                       AUTOMOBILE WINDOW SCREEN
                         Filed Aug. 25, 1944
*Fig. 1.*
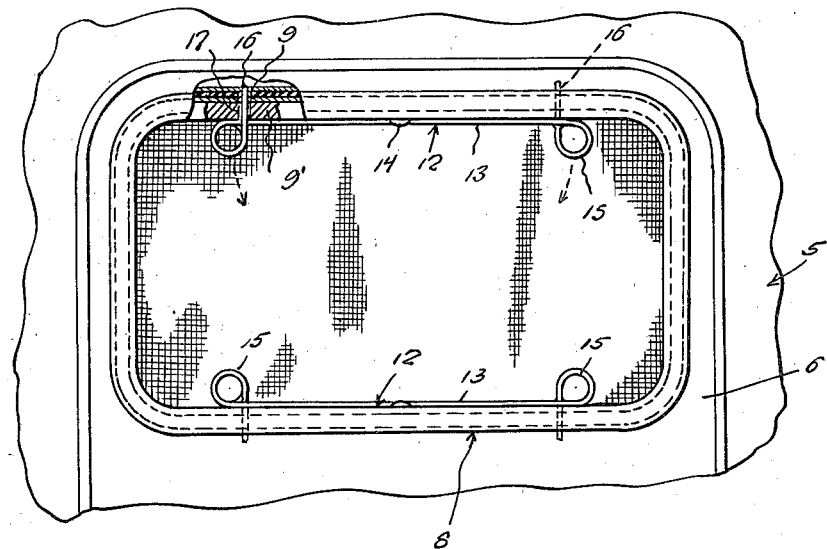
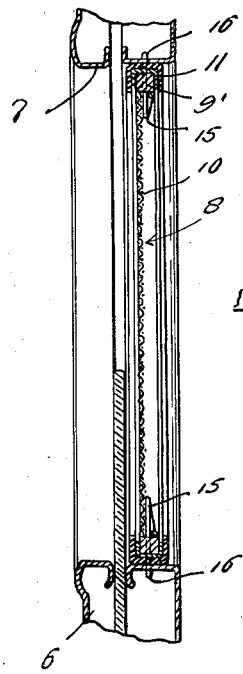
*Fig. 2.*
*Fig. 3.*
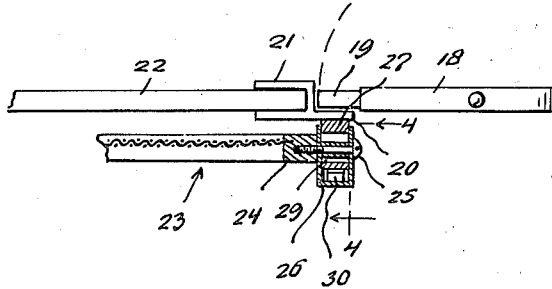
*Fig. 4.*
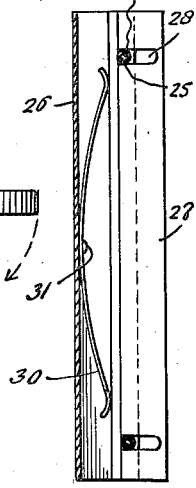
Inventor
Frank Kolarik,
By McMorrow and Berman
Attorneys Patented Nov. 13, 1945

2,388,747

UNITED STATES PATENT OFFICE 2,388,747

AUTOMOBILE WINDOW SCREEN

Frank Kolarik, Cicero, Ill.

Application August 25, 1944, Serial No. 551,178

4 Claims. (Cl. 160—369)

This invention appertains to new and useful improvements in window screens, and more particularly to a window screen especially adapted for use in the windows of automobiles.

The principal object of the present invention is to provide a window screen of the character stated which can be readily disposed into the window opening and just as easily removed when the occasion demands.

Another important object of the invention is to provide a readily insertible and removable window screen for automobile windows which will serve to exclude insects and other foreign creatures and elements without interfering with ventilation.

Still another important object of the invention is to provide a window screen which will not interfere with the opening and closing of automobile windows.

Various other important objects and advantages of the invention shall become apparent to the reader of the following description.

In the drawing:

Figure 1 is a fragmentary outside elevational view with a portion in section, showing the improved screen mounted in an automobile window opening.

Figure 2 is a fragmentary vertical sectional view through the structure shown in Figure 1.

Figure 3 is a fragmentary horizontal sectional view through a slightly modified form of the invention showing the screen modified to accommodate windows provided with swingable ventilating panels.

Figure 4 is an enlarged fragmentary detail sectional view taken on line 4—4 of Figure 3.

Referring to the drawing, wherein like numerals designate like parts, it can be seen that numeral 5 generally refers to an automobile body. Numeral 6 denotes a door having a window opening 7 and as shown in Figures 1 and 2, the present invention, generally referred to by numeral 8 is mounted within this window opening. As a matter-of-fact, each of the window openings of an automobile body may be prepared for the reception of one of these improved screens 8, the only preparation being required is the boring of two upper and two lower openings in the walls of the window opening. These openings are denoted by numeral 9.

The window screen consists of a substantially rectangular shaped frame 9' shaped at its corner portions and in any other manner required to conform with the contour of the window opening. Within this frame is stretched and secured a foraminous sheet or screen 10.

A channeled runner 11 is disposed about the perimeter of the frame 9' to contact the wall of the window opening 7 and to safeguard this surface against being marred by the screen frame.

At the upper and lower portions of the screen and within the confines of the frame 9' are holding means generally referred to by numeral 12. Each of these holding means consists of an elongated spring wire 13 secured fixedly only at its intermediate portion, as at 14, to the inside of the frame. The end portions of this elongated spring wire memebr 13 free of fixed attachment to the frame 9' are looped, as at 15, and the end portions 16 are disposed across the adjacent main body portion of the spring wire member 13 and at right angles thereto to project through corresponding openings 17 in the frame 9'. Openings are also formed in the chaneled resilient runner 11 registering with the openings 17 and these openings, of course, register with the drilled openings 9 in the wall of the window opening 7. It is preferable that the loops 15 be sufficiently large so that fingers and thumbs may be inserted therein to remove the projecting portions 16 of the spring wire members 13 from the openings 9 when it is desired that the screen be removed from the window opening.

Figures 3 and 4 show a slightly modified form of screen and this is especially adapted for use with the types of automobile windows which have swingable ventilating panels therein. In viewing Figure 3, it can be seen that numeral 18 denotes an ordinary swingable ventilating panel which has an edge portion 19 engageable against a stop flange 20 on a vertical guide 21. Numeral 22 denotes the regular window pane of this particular type of vertically slidable window.

Generally referred to by numeral 23 is the modified form of screen especially adapted for installation in the type of window having a ventilating panel. This type of screen is shorter horizontally than the entire width of the window opening so that it will terminate at the vertical window pane guide 21. The modified screen consists of a suitably shaped frame 24 having secured at one end by screws 25, a channeled vertically disposed trough 26. In this trough 26 is a horizontally slidable strip 27, of suitable material, the same having slots 28 therein through which spaced sleeves 29 are disposed and through these spaced sleeves extend the retaining screws 25.

A strip spring 30 secured at its intermediate portion, as at 31, to the inside of the back of the trough 26 has its end portions bearing against the opposite end portions of the slide strip 27 to hold the same urged snugly against the flange 20 of the vertical guide 21, so that insects cannot get between the screen and the guide 21 to pass through the window opening. Of course, with this form of screen, the ventilating panel 18 will be left closed if it is desired to entirely exclude the possibility of the entrance of insects.

The form of the invention denoted by numeral 23 (see Figure 3), will be equipped with retaining means, the same or similar to that shown in Figure 1 and generally referred to by numeral 12.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A screen of the character described comprising a frame, a foraminous covering filler for the frame, said frame having openings therein, and spring members projecting through the openings to serve as detents in holding the frame within a window opening.

2. A screen of the character described comprising a frame, a foraminous covering filler for the frame, said frame having openings therein, spring members projecting through the frame to serve as detents in holding the frame within a window opening, said spring members consisting each of an elongated spring wire member secured at its intermediate portion to the inside of the frame, said spring wire member being formed with loops at its end portions, the extremities of the wire members being disposed across the wire members and disposed through the openings of the frame to normally project beyond the perimeter of said frame.

3. In combination with an automobile window opening having openings formed in the wall thereof, a frame having openings therein registering with the openings of the window opening wall, a foraminous covering filler for the frame, detents mounted on the frame and provided with projecting portions adapted for disposition through the registering openings, each of said detents consisting of an elongated spring element having its end portions looped back upon itself with its end portions projecting through said registering openings.

4. In a window screen of the character described comprising a frame having an opening therein, a spring member, said spring member being anchored to the frame and provided with a finger loop defining end portion, the end of the spring member at the finger loop projecting in a direction extending through the opening in the frame.

FRANK KOLARIK.